W. T. RICHARDS.
BUSHING OR BEARING DEVICE.
APPLICATION FILED SEPT. 27, 1912.
1,126,276.
Patented Jan. 26, 1915.
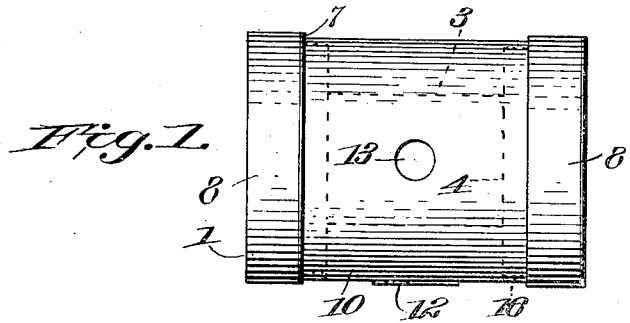
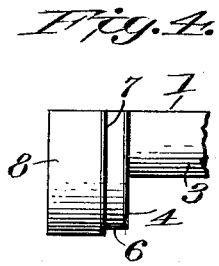
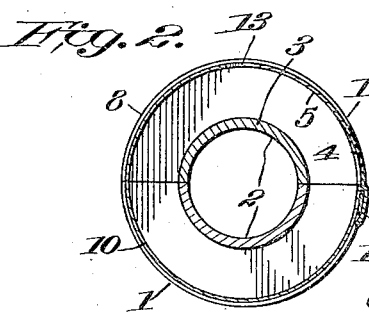
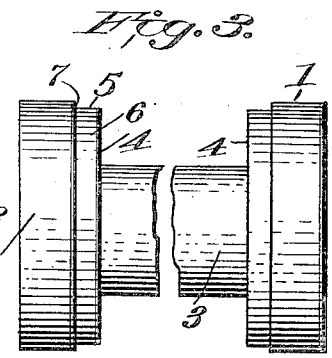
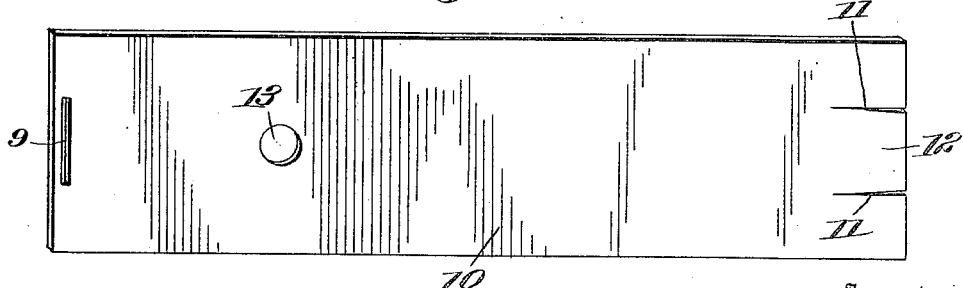
Witnesses
S. White
M. [illegible]
Inventor
William T. Richards,
By Richard Bewen
his Attorney

UNITED STATES PATENT OFFICE.

WILLIAM T. RICHARDS, OF NEW ORLEANS, LOUISIANA.

BUSHING OR BEARING DEVICE.

1,126,276.  Specification of Letters Patent.  Patented Jan. 26, 1915.

Application filed September 27, 1912.  Serial No. 722,603.

*To all whom it may concern:*

Be it known that I, WILLIAM T. RICHARDS, a citizen of the United States, residing at New Orleans, in the parish of Orleans and State of Louisiana, have invented new and useful Improvements in Bushing or Bearing Devices, of which the following is a specification.

My invention relates to a bushing or bearing device.

The main object of my invention is to provide a simple and effective device of this kind which may be manufactured at very low cost, the bushing being adapted to have secured thereto a wheel or pulley and to receive in its bore a shaft or the like.

In connection with said object, another object of the invention is to provide the bushing of a plurality of separate parts adapted to surround a shaft, and so formed as to provide a lubricant reservoir or chamber.

Another object of the invention in connection with the previous objects, is to provide a removable cuff or the like to form a wall or closure for the reservoir or lubricant chamber and to serve as a means for securing the bushing parts together.

Another object of the invention is to provide such a construction as will permit the separate bushing parts to be made of wood, preferably hard wood, and the cuff to be made of suitable thin metal such as tin.

A further object of the invention is to provide an exceedingly simple form of cuff made in a single piece and having inter-locking means to secure the same in continuation around the lubricant reservoir or chamber.

The preferred embodiment of my invention is described hereinafter in connection with the drawings accompanying this specification, and wherein:—Figure 1 is a plan view. Fig. 2 is a transverse sectional view. Fig. 3 is a plan view with the cuff removed. Fig. 4 is a detail view of one end of one of the bushing members. Fig. 5 is a perspective view of the cuff showing the same immediately after being cut or stamped, and before application to the bushing parts.

Referring to the drawings, like reference characters designate like parts throughout the several views.

The bushing proper comprises two separate members collectively providing a device somewhat similar in shape to a spool. Said members are designated 1 and hereinafter will be referred to as bushing members.

Said bushing members may be made of any suitable material, preferably of hard wood, as the same provides a cheap and at the same time highly efficient material. In manufacturing the device a block or cylinder of wood is ripped or split to provide parts from which the bushing members 1 are made. Thereupon the block is hollowed or grooved as at 2 so that the bushing members when connected, will provide a circular opening in which a shaft is received. Said members 1 have relatively thin shaft inclosing portions 3, so formed as to provide above the same, in connection with an inclosing cuff to be hereinafter referred to, a reservoir or oil chamber. In cutting away the members 1, walls 4 are provided which serve as end walls for the reservoir.

The members 1 are cut away as at 5 to provide reduced rims 6 and thereby a vertical wall 7, so as to accommodate the reception of the cuff to be hereinafter referred to.

Between the walls 7 and ends of the members are provided rims designated 8.

Referring now to the cuff, the same is stamped or cut preferably from flexible, thin sheet metal, such as tin. In the stamping process a slot 9 is cut adjacent one end of the cuff, which is generally designated 10, and at the other end of the cuff the same is scored or cut as at 11 to provide a tongue 12. An opening 13 is also provided in the cuff. In assembling the parts, the two bushing members are brought together and secured in such position by means of the cuff 10, as shown in Figs. 1 and 2. In applying said cuff the same seats on the rim 6 and its side edges bear against the walls 7, and thus prevents longitudinal displacement of the cuff. The cuff is locked by passing the tongue 12 through the slot or opening 9 and then tightly drawing the tongue to secure the cuff tightly around the bushing members, and afterward clenching or bending the tongue 12 over the portion of the cuff intermediate the slot 9, and end adjacent thereto.

The lubricant is supplied to the chamber through the opening 13 and passes between the parts 3 onto the shaft mounted within the central bore or opening between the bushing members. The bushing is to be mounted within a pulley or wheel and support the same from a shaft or the like, as is obvious.

It will thus be seen that I have provided an exceedingly simple form of bushing, and one which may be readily manufactured at low cost.

As I have only shown the preferred embodiment of my invention herein, it is to be understood that changes in the details of construction thereof within the spirit and scope of the appended claims may be made, and such changes are accordingly reserved.

Having thus described my said invention, what I claim and desire to secure by Letters Patent is:—

1. A pair of bushing members, each comprising identical sections having annular shoulders formed thereon to provide reduced rims, a shaft embracing portion comprising identical sections, a cuff seated upon said rims and prevented from longitudinal movement by said shoulders, means formed integrally with said cuff for locking said cuff to hold said bushing members and said shaft embracing portions in assembled relation to provide a reservoir and a closure therefor between said cuff and said shaft embracing portion.

2. A pair of bushing members each comprising two identical shaft embracing sections having annular cut away portions formed on the inner edges thereof providing reduced rims and annular shoulders, relatively thin shaft embracing portions comprising two identical sections, a metallic cuff seated upon said rim and prevented from longitudinal movement by said annular shoulder and said cuff provided with a slot at one end and a tongue at the other end for engagement with said slot whereby to lock said cuff upon said bushing members to hold said bushing members and said shaft embracing portions in assembled relation and to provide a reservoir and a closure therefor between said cuff and said shaft embracing portions, said cuff being provided with an opening leading to said reservoir to allow for filling of said reservoir.

WILLIAM T. RICHARDS.

Witnesses:
JAS. SIMONS,
THOS. C. NICHOLLS, Jr.

Copies of this patent may be obtained for five cents each, by addressing the "Commissioner of Patents, Washington, D. C."